United States Patent
Lefferts

(10) Patent No.: US 10,339,249 B2
(45) Date of Patent: Jul. 2, 2019

(54) USING COLOR PATTERN ASSIGNED TO SHAPES FOR CUSTOM LAYOUT OF INTEGRATED CIRCUIT (IC) DESIGNS

(71) Applicant: Synopsys, Inc., Mountain View, CA (US)

(72) Inventor: Robert B. Lefferts, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 315 days.

(21) Appl. No.: 15/084,094

(22) Filed: Mar. 29, 2016

(65) Prior Publication Data
US 2017/0286584 A1  Oct. 5, 2017

(51) Int. Cl.
*G06F 17/50* (2006.01)
*H01L 27/088* (2006.01)

(52) U.S. Cl.
CPC ...... *G06F 17/5072* (2013.01); *G06F 17/5077* (2013.01); *G06F 17/5081* (2013.01); *H01L 27/0886* (2013.01)

(58) Field of Classification Search
CPC ............. G06F 17/5072; G06F 17/5077; G06F 17/5081; H01L 27/0886
See application file for complete search history.

(56) References Cited

U.S. PATENT DOCUMENTS

| 5,392,222 | A | * | 2/1995 | Noble | G06F 17/5068 716/52 |
| 5,530,372 | A | * | 6/1996 | Lee | G01R 31/2886 324/754.03 |
| 5,604,819 | A | * | 2/1997 | Barnard | G06T 5/20 382/151 |
| 6,684,380 | B2 | * | 1/2004 | Rubin | G06F 17/5018 700/121 |
| 6,698,007 | B2 | * | 2/2004 | Wu | G03F 1/30 430/5 |
| 7,571,416 | B2 | * | 8/2009 | Watanabe | G06F 17/5068 716/104 |
| 7,934,177 | B2 | * | 4/2011 | Shin | G03F 1/36 716/55 |
| 8,209,649 | B2 | * | 6/2012 | McIlrath | G06F 17/5045 716/100 |
| 8,209,656 | B1 | * | 6/2012 | Wang | G03F 1/70 716/118 |
| 8,375,348 | B1 | * | 2/2013 | Raj | G06F 17/5018 716/126 |
| 8,407,228 | B1 | * | 3/2013 | Hahn | G06F 17/30589 707/745 |

(Continued)

*Primary Examiner* — Naum Levin
(74) *Attorney, Agent, or Firm* — Park, Vaughan, Fleming & Dowler LLP; Laxman Sahasrabuddhe

(57) ABSTRACT

Systems and techniques for facilitating layout of an integrated circuit (IC) design are described. A distinct color pattern can be assigned to a set of shapes in a layout of the IC design that correspond to a net. Next, the layout of the IC design can be displayed in a graphical user interface (GUI) of the IC design tool. Some embodiments can move a diffusion region of a multigate device with respect to the location of the device contacts so that the diffusion region is aligned with respect to a set of fin tracks, wherein each fin of each multigate device is located on a fin track.

15 Claims, 15 Drawing Sheets
(8 of 15 Drawing Sheet(s) Filed in Color)

---

For each net in a set of nets in the IC design, assign a distinct color pattern to a set of shapes in a layout of the IC design that correspond to the net, wherein each shape in the set of shapes corresponds to a physical structure in an IC chip that can be manufactured based on the IC design
522

↓

Display the layout of the IC design in a graphical user interface (GUI) of the IC design tool, wherein each shape in the layout of the IC design is displayed in the GUI of the IC design tool using the color pattern assigned to the shape
524

(56) References Cited

U.S. PATENT DOCUMENTS

| | | | | |
|---|---|---|---|---|
| 8,418,111 B2* | 4/2013 | Chen | G06F 17/5077 | 716/119 |
| 8,429,574 B2* | 4/2013 | Cao | G03F 1/70 | 430/5 |
| 8,448,120 B2* | 5/2013 | Huang | G03F 1/36 | 703/23 |
| 8,468,470 B2* | 6/2013 | Hsu | G03F 1/70 | 716/54 |
| 8,495,556 B2* | 7/2013 | Green | G06F 17/5045 | 716/138 |
| 8,601,408 B2* | 12/2013 | Chen | G06F 17/5077 | 716/126 |
| 8,631,379 B2* | 1/2014 | Chen | G06F 17/5081 | 716/113 |
| 8,661,371 B1* | 2/2014 | Wang | G06F 17/5068 | 716/52 |
| 8,709,684 B2* | 4/2014 | Chern | G06F 17/5077 | 430/30 |
| 8,741,763 B2* | 6/2014 | Ma | H01L 23/528 | 257/E21.249 |
| 8,782,586 B2* | 7/2014 | Sezginer | G06F 17/5077 | 716/126 |
| 8,806,414 B2* | 8/2014 | Huang | G06F 17/5081 | 716/106 |
| 8,935,639 B1* | 1/2015 | Tzeng | G06F 17/5077 | 430/30 |
| 9,165,104 B1* | 10/2015 | Wang | G03F 1/70 | |
| 9,219,005 B2* | 12/2015 | Or-Bach | B82Y 10/00 | |
| 9,299,842 B2* | 3/2016 | Baek | G06F 17/5063 | |
| 9,536,778 B2* | 1/2017 | Yuan | H01L 21/76802 | |
| 9,652,579 B1* | 5/2017 | Arkhipov | G06F 17/5081 | |
| 9,727,683 B2* | 8/2017 | Liu | G06F 17/5077 | |
| 9,740,814 B1* | 8/2017 | Ghosh | G03F 7/70 | |
| 9,773,089 B2* | 9/2017 | Lee | G06F 17/5081 | |
| 2013/0020707 A1* | 1/2013 | Or-Bach | B82Y 10/00 | 257/741 |
| 2013/0061186 A1* | 3/2013 | Hsu | G06F 17/50 | 716/55 |
| 2013/0062771 A1* | 3/2013 | Kodama | H01L 21/0337 | 257/773 |
| 2013/0132913 A1* | 5/2013 | Fu | G06F 17/5081 | 716/51 |
| 2014/0077303 A1* | 3/2014 | Baek | G06F 17/5063 | 257/365 |
| 2014/0131879 A1* | 5/2014 | Kodama | G06F 17/5072 | 257/773 |
| 2014/0278266 A1* | 9/2014 | Faken | G06F 17/5009 | 703/1 |
| 2014/0282324 A1* | 9/2014 | Greiner | G06F 17/5068 | 716/111 |
| 2015/0007121 A1* | 1/2015 | Lin | G06F 17/5068 | 716/112 |
| 2016/0070841 A1* | 3/2016 | Salowe | G06F 17/5077 | 716/112 |
| 2016/0217233 A1* | 7/2016 | Kamon | G06F 17/5068 | |
| 2017/0358585 A1* | 12/2017 | Lim | H01L 27/1104 | |

* cited by examiner

USING COLOR PATTERN ASSIGNED TO SHAPES FOR CUSTOM LAYOUT OF INTEGRATED CIRCUIT (IC) DESIGNS

TECHNICAL FIELD

This disclosure relates to integrated circuit (IC) design. More specifically, this disclosure relates to custom layout of IC designs.

BACKGROUND

Related Art

Improvements in process technologies and IC design software tools have continued to shrink device sizes for decades. However, as process technologies approach and move past the 20-nanometers (nm) process node, it is becoming increasingly difficult to shrink device sizes. Specifically, it has become very difficult, if not impossible, to optimize both performance and power at these process nodes.

Three-dimensional (3D) multigate device designs (FinFET technology being one such multigate technology) promise to continue the relentless march toward smaller device sizes. In particular, these 3D multigate device designs allow optimization of both performance and power when compared to traditional planar device designs.

FIG. 1A illustrates a FinFET device. A FinFET device has a three-dimensional structure comprising source 106, drain 108 and gate 110 that rise above silicon substrate 102 and oxide layer 104. The 3D structure gives the FinFET device more volume than a planar gate for the same planar area. The three-dimensional structure of gate 110 "wraps" around the conducting channel comprising source 106 and drain 108, which causes gate 110 to have excellent control of the current that passes through the conducting channel. Because gate 110 "wraps" around the conducting channel, it appears as if there is a gate on each of the three sides of the conducting channel. This is the reason why FinFET devices are called "multigate" devices. Note that the conducting channel (which includes source 106 and drain 108) is shaped like a "fin," hence the name "Fin Field Effect Transistor," or "FinFET" for short. Very little current is allowed to leak through the body of the FinFET when the device is in the off state. This allows FinFET devices to have lower threshold voltages than planar devices, which results in faster switching speeds and lower leakage and dynamic power consumption when compared with similarly sized planar devices.

It is important to ensure that the width of the "fin" is narrow so that the gate has excellent control of the current and very little current leaks through the body of the FinFET when it is in the off state. However, this means that the drive strength of each "fin" is also low. There are at least two approaches to increase the drive strength of a FinFET device. One approach is to increase the height of the "fin." However, reliably manufacturing FinFETs with different fin heights can be very challenging. The other approach, which is used by some semiconductor fabrication facilities, is to use multiple FinFET devices in parallel. FIG. 1B illustrates how multiple FinFET devices can be used in parallel to increase drive strength. The FinFET device shown in FIG. 1B includes multiple sources 152 and multiple drains 154. The total drive current is the sum of the individual currents passing through the "fins." Note that the current passing through each of the "fins" is controlled by the same gate, namely gate 150. Also note that, in this approach, the height of the "fin" remains the same; device scaling is achieved by having multiple "fins" in the same device.

It can be very time-consuming and cumbersome to use conventional IC design tools to create and manipulate IC design layouts, especially those that include multigate devices, such as FinFET devices.

SUMMARY

Some embodiments described herein provide IC design tools for creating and manipulating IC design layouts that include multigate devices, such as FinFET devices. Specifically, some embodiments provide graphical user interface (GUI) features that facilitate custom layout of multigate devices.

During operation, some embodiments can place a multigate device in an IC design layout so that a device contact (e.g., gate, source, or drain contact) of the multigate device is aligned with respect to a set of interconnection tracks, wherein electrical connections between circuit elements in the IC design layout are routed along interconnection tracks. Next, the embodiments can move a diffusion region of the multigate device with respect to the location of the device contact so that the diffusion region is aligned with respect to a set of fin tracks, wherein each fin of each multigate device is located on a fin track. Note that adjacent interconnection tracks in the set of interconnection tracks can be a first distance apart from each other, and adjacent fin tracks in the set of fin tracks can be a second distance apart from each other. In some embodiments, the second distance can be different from the first distance, e.g., less than the first distance.

Prior to placing the multigate device in the IC design, some embodiments can receive a placement location for placing the multigate device. Next, the embodiments can determine a snapped placement location for the multigate device based on an interconnection track in the set of interconnection tracks that is closest to the placement location.

In some embodiments, for each net in a set of nets in the IC design, a distinct color pattern can be assigned to a set of shapes in a layout of the IC design that correspond to the net, wherein each shape in the set of shapes corresponds to a physical structure in an IC chip that can be manufactured based on the IC design. Next, the embodiments can display the layout of the IC design in a GUI of the IC design tool, wherein each shape in the layout of the IC design is displayed in the GUI of the IC design tool using the color pattern assigned to the shape. Specifically, some embodiments can color shapes in the IC design layout with one or more color patterns, wherein shapes that are to be electrically connected with one another are colored using the same color pattern. The resulting view can be presented to a user via the GUI to help the user to electrically connect the shapes in the IC design layout based on the color patterns.

Some embodiments can display a set of GUI objects in the layout of the IC design for creating electrical contacts, wherein each GUI object in the set of GUI objects corresponds to a shape in the layout of the IC design. Next, the embodiments can create an electrical contact at each shape corresponding to each GUI object that was selected by a user. The embodiments can then use a router to create electrical connections between electrical contacts that were created by the user by selecting the corresponding GUI objects. Specifically, in some embodiments, GUI objects can be displayed in the IC design layout for creating electrical contacts. Each GUI object (e.g., a square symbol) can correspond to a shape (e.g., a rectangle that corresponds to a gate) in a multigate device. Next, for each GUI object that is selected by a user (e.g., by a mouse click), the embodiment can create an electrical contact at the location of the GUI object. A router can then be used to create electrical connections among the electrical contacts that were created by selecting GUI objects in the IC design layout.

Some embodiments can display a set of GUI objects in the layout of the IC design for cutting shapes in the layout of the IC design, wherein each GUI object in the set of GUI objects corresponds to a location in the layout of the IC design where at least one shape can be cut, and wherein a short between two nets corresponds to two abutting shapes in the layout of the IC design that are colored using two distinct color patterns. Next, the process can, for each GUI object that was selected by a user, cut at least one shape at a location corresponding to the selected GUI object. In some embodiments, GUI objects can be displayed in the IC design layout for cutting a polysilicon shape in the multigate device. Specifically, each GUI object (e.g., a square symbol) can correspond to a shape (e.g., a rectangle that corresponds to a gate) in a multigate device. Next, for each GUI object that is selected by a user (e.g., by two consecutive mouse clicks), the embodiment can cut the polysilicon shape that is at the location of the selected GUI object.

In some embodiments, the multigate device can be represented by a parameterized cell that includes (1) parameters for source, drain, and gate connection locations, and (2) parameters for device dimensions, wherein each parameter value is specified as a multiple of the interconnection pitch (the interconnection pitch can be defined as the distance from the center of one interconnection track to the center of an adjacent interconnection track). For example, if the interconnection pitch is equal to d nanometers, and if a value of a parameter in a parameterized cell is equal to "3," then that means that the parameter value is equal to 3 d nanometers.

BRIEF DESCRIPTION OF THE FIGURES

This patent application (or patent after issuance) contains at least one drawing executed in color. Copies of this patent application after publication (or patent after issuance) with color drawings will be provided by the Office upon request and payment of the necessary fee.

DETAILED DESCRIPTION

Figure 1A:
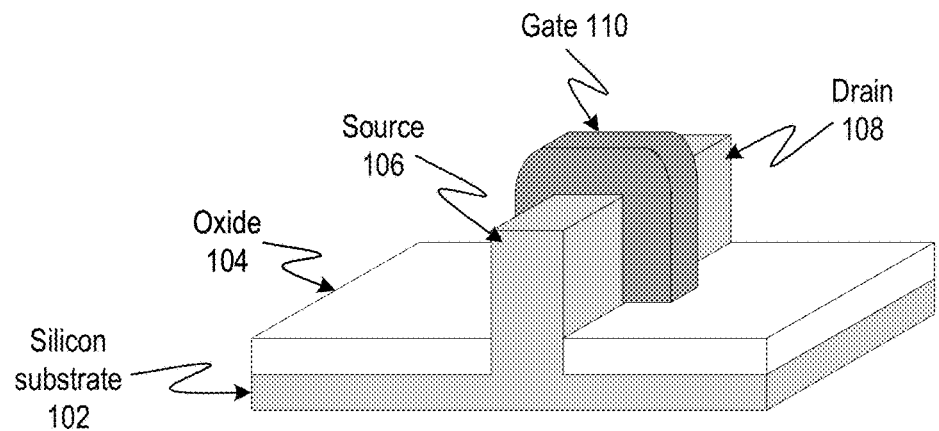
FIG. 1A illustrates a FinFET device, which is a specific multigate technology.
Figure 1B:
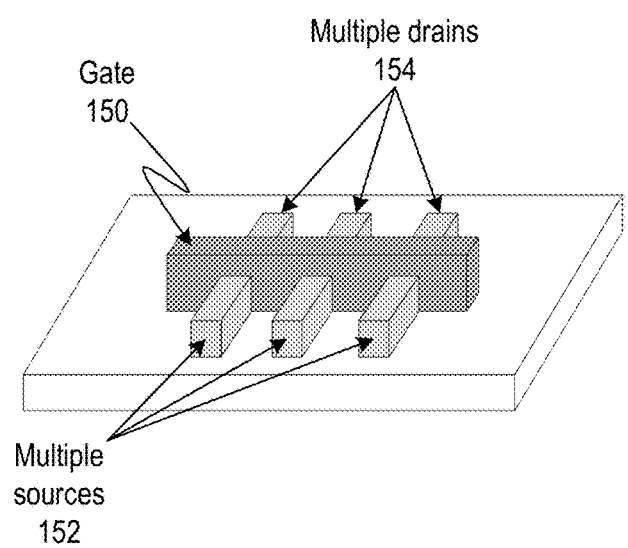
FIG. 1B illustrates how multiple FinFET devices can be used in parallel to increase drive strength.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of IC Design

IC design software tools can be used to create an IC design. Once the IC design is finalized, it can undergo fabrication, packaging, and assembly to produce IC chips. The overall IC design and manufacturing process can involve multiple entities, e.g., one company may create a software tool that is used in the IC design flow, another company may use the software tool to create an IC design using the IC design flow, and yet another company may manufacture IC chips based on the IC design that was created using the IC design flow. An improvement in any one of the steps in the IC design flow results in an improvement in the overall IC design and manufacturing process. For example, an improved software tool that is used in the IC design flow improves the overall IC design and manufacturing process. An IC design flow can include multiple steps, and each step can involve using one or more IC design software tools. Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled. Some embodiments described herein provide software tools that can be used during design planning for creating a layout for an IC design (e.g., for IC designs that include of multigate devices), thereby improving the overall IC design and manufacturing process. Specifically, some embodiments described herein can improve the user-friendliness, performance, and/or QoR of one or more IC design tools.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Overview of Custom Layout of Multigate Devices

Figure 2A:
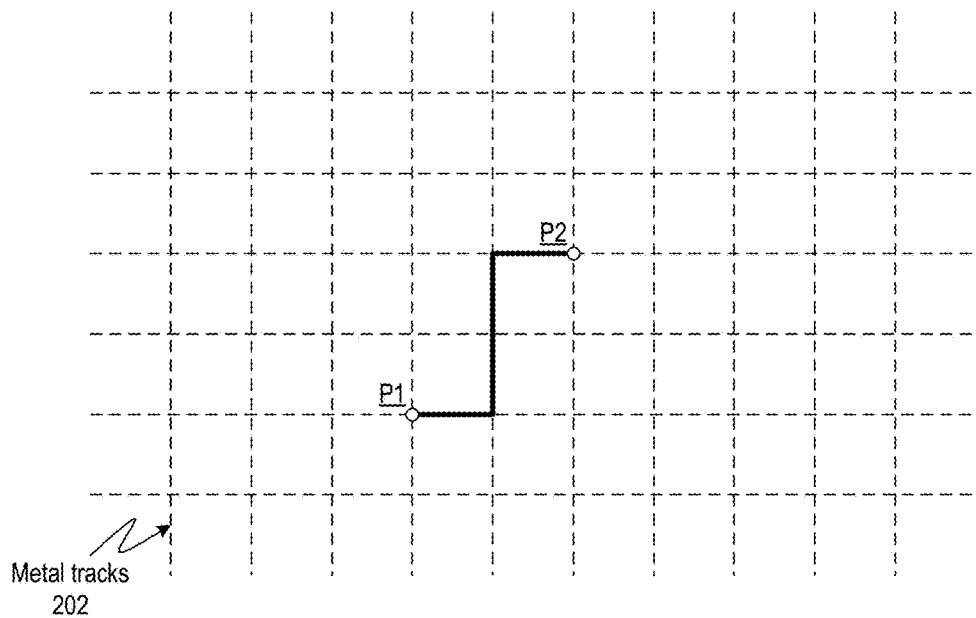
FIG. 2A illustrates a routing grid in accordance with some embodiments described herein.

Circuit elements in an IC design layout can be electrically connected to each other using wires that are routed along a routing grid. FIG. 2A illustrates a routing grid in accordance with some embodiments described herein. Metal tracks 202 are typically arranged in a set of equally spaced horizontal and vertical lines. The distance between two adjacent metal tracks is called the metal pitch. In FIG. 2A, the vertical and horizontal metal pitches are equal, but they don't have to be equal in the general case. When an electrical connection needs to be made between an output terminal P1 of one circuit element and the input terminal P2 of another circuit element, a metal wire can be routed along the horizontal and vertical metal tracks as shown in FIG. 2A.

Figure 2B:
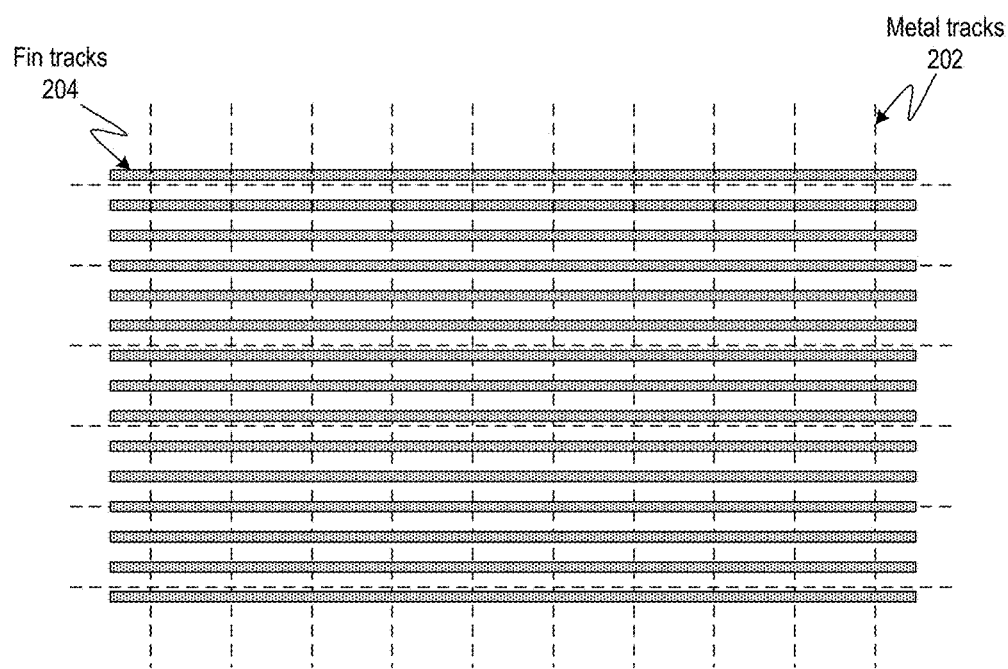
FIG. 2B illustrates a set of fin tracks in accordance with some embodiments described herein.

A semiconductor fabrication technology may require the fins to be located along a pre-determined set of fin tracks in the layout. FIG. 2B illustrates a set of fin tracks in accordance with some embodiments described herein. When a FinFET device is placed in the IC design layout, the FinFET device typically needs to satisfy two constraints. First, the fins of the FinFET device have to be located along the fin tracks. Second, the ends of the gate have to be aligned with the fin tracks, i.e., the length of the gate has to be a multiple of the fin pitch.

Note that the source and drain of the FinFET device are located on the fin tracks, and in conventional circuit layout tools, the electrical contact for the gate is also aligned with the fin tracks. When the FinFET device is electrically connected with other circuit elements, a wire will have to be routed from the gate, source, and drain terminals of the FinFET device to the terminals of other circuit elements. Conventional circuit layout tools place FinFET devices based on the fin tracks. Unfortunately, as shown in FIG. 2B, fin tracks 204 may not align with metal tracks 202. Therefore, conventional circuit layout tools can result in non-optimal terminal locations for the layout engineer to make the required device connections since the fin and metal pitches don't match. Conventional circuit layout tools also have other drawbacks. Conventional circuit layout tools help the layout engineer visualize where connections are required by using flightlines or net highlights. However, FinFET technologies also require adding cut-layers to get proper connectivity, but flightlines cannot be used to show where the layout shapes need to be cut. Moreover, once the FinFET devices have been placed, conventional circuit layout tools do not help the layout engineer complete the layout while meeting increasingly complex design rules. Conventional circuit layout tools do point out when a given IC design layout violates one or more design rules, but it is not very useful to simply know that the IC design layout violates a set of design rules which can run into 700 pages. An IC design layout tool would be much more useful if the tool could help a layout engineer reduce or eliminate the occurrence of design rule violations in the first place.

Some embodiments described herein provide IC design layout tools that do not have the above-mentioned drawbacks. Specifically, some embodiments make it easy for the layout engineer to make the required connections between FinFET devices. In some embodiments, FinFET devices can be placed on interconnect tracks (i.e., the grid that is used for routing electrical connections), not fin tracks. After placing devices on interconnect tracks, the diffusion regions are then snapped to the closet fin track, thereby aligning the boundaries of the FinFET device with the fin tracks.

Some embodiments feature a FinFET parameterized cell (PCell) with parameters for source/drain and gate connections and device footprints specified in interconnect tracks instead of real numbers with units of length (e.g., instead of specifying the device footprint in nanometers).

Once all possible connections are on an interconnect grid, some embodiments use a two-dimensional (2D) color-coded stick diagram on top of the existing layout. This color-coded stick diagram, which is called "a connection matrix" in this disclosure, can be used to allocate routing channels and make connection from a metal layer down to all of the devices in an IC design very quickly. This then allows the actual connections to be made by a router.

In the connection matrix, color is added to existing shapes to show where connections need to be made and where cuts need to be added based on the nets. Specifically, conflicting colors on polysilicon show where polysilicon cuts are required. By coloring existing objects in the IC design layout, the layout engineer can visualize connectivity without adding any clutter to the view in the GUI. This is in contrast to conventional IC design layout tools that add flightlines to an already cluttered layout view. Moreover, because of limitations of human vision, flightlines (which are used in conventional IC design layout tools) are typically limited to around 10 colors or 10 unique nets without repeat colors. In contrast to conventional tools, some embodiments described herein can use stipple patterns in the colored shapes to support approximately 60 unique nets.

In some embodiments, the connection matrix can be integrated with the FinFET PCells to enable a layout engineer to make connections (e.g., by adding a via) or break connections (e.g., by cutting polysilicon) using mouse-clicks. Some embodiments can achieve correct-by-construction connections by adapting the connection matrix as connections are made to remove no-longer-valid connections that would violate DRC (design rule check) rules. The following sections provide further details of some of the above-described embodiments.

Placement of Multigate Devices in a Custom Layout

FIGS. 3A-3E illustrate how a GUI of an IC design layout tool can be used to place multigate devices in accordance with some embodiments described herein. FIGS. 3A-3E are for illustration purposes only and are not intended to limit the embodiments described herein to the forms disclosed.

IC design layout view 300 can be shown in a GUI window of an IC design layout tool. Horizontal grey stripes correspond to fin tracks, which are labeled F1-F12. Each contact is represented as a white square with a cross in it. For example, in FinFET devices 302 and 304, contacts 306 and 308 are represented as white squares with a cross, respectively. Contacts 306 and 308 are for creating an electrical connection with the respective diffusion regions. Similar contacts can be made for creating an electrical contact with the gate (see e.g., the contact illustrated for gate structure 408 in FIG. 4D). Furthermore, note that the gates typically extend vertically and do not terminate in the manner shown in FIG. 3A (see e.g., gate structure 408 that extends from the top edge to the bottom edge of circuit layout view 400). In some semiconductor manufacturing technologies, the sources and drains of FinFET devices are terminated using dummy gates. The three vertical bright red rectangles correspond to the gates—the middle rectangle is the actual gate of the FinFET device, and the other two gates are dummy gates that are used for terminating the source and drain regions. For example, in FinFET device 304, gate 310 and dummy gates 316 are represented using vertical bright red rectangles. The diffusion region, e.g., diffusion 312 in FinFET device 304, is represented using a darker red color. Local interconnects are represented in green, e.g., local interconnect 314 in FinFET device 304. Finally, the horizontal metal tracks are represented using blue lines, and the vertical metal tracks are represented using purple lines.

Note that the contact in each FinFET device can be located at a different place relative to the rest of the device. For example, contact 308 is approximately in the middle of the top and bottom edges of FinFET device 304, whereas contact 306 is closer to the bottom edge of FinFET device 302. This is because some embodiments described herein first place a FinFET device on a metal track (which fixes the location of the contact), and then the diffusion region of the FinFET device is allowed to "wobble" so that it snaps to the closest fin track (which causes the contact to be in different locations for different FinFET device instances).

Figure 3A:
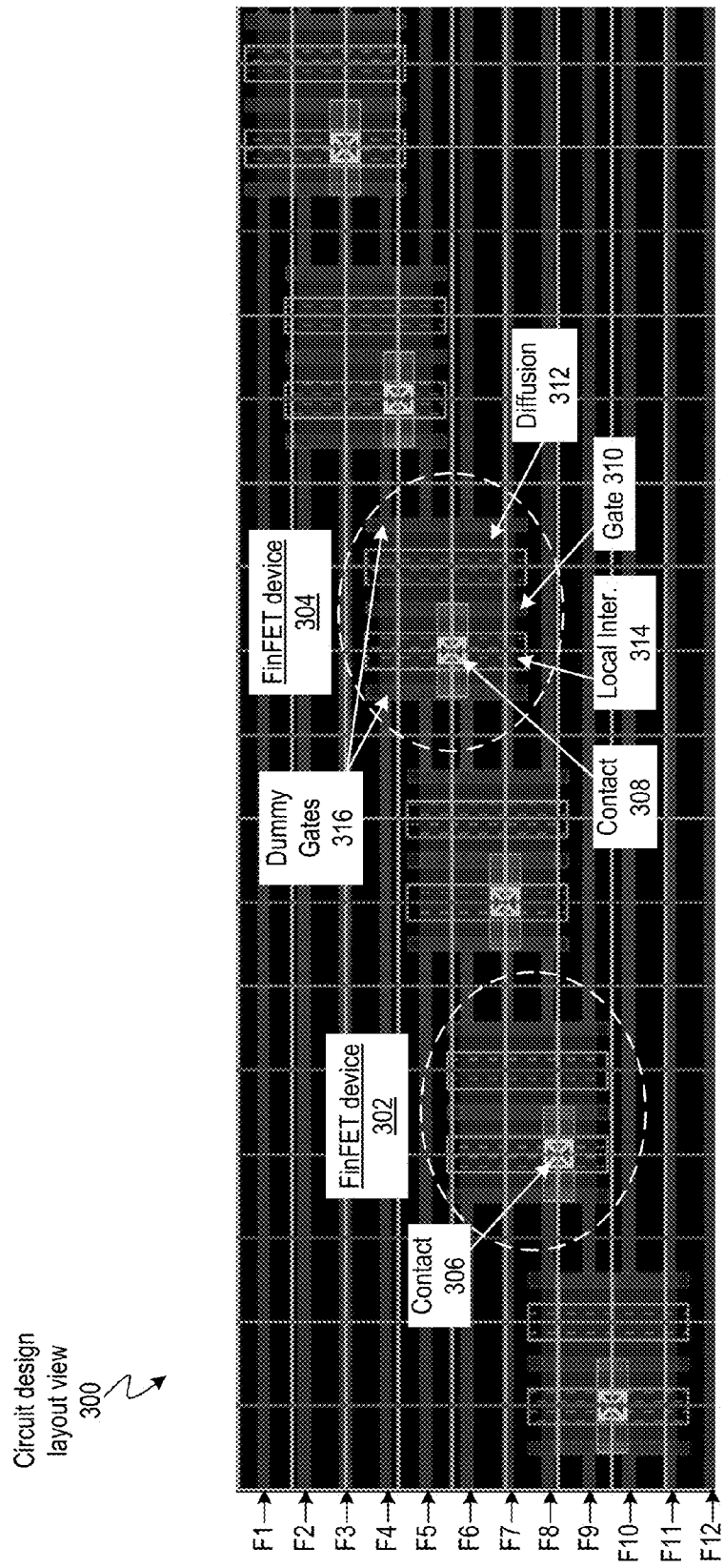
FIGS. 3A-3E illustrate how a GUI of an IC design layout tool can be used to place multigate devices in accordance with some embodiments described herein.
Figure 3B:
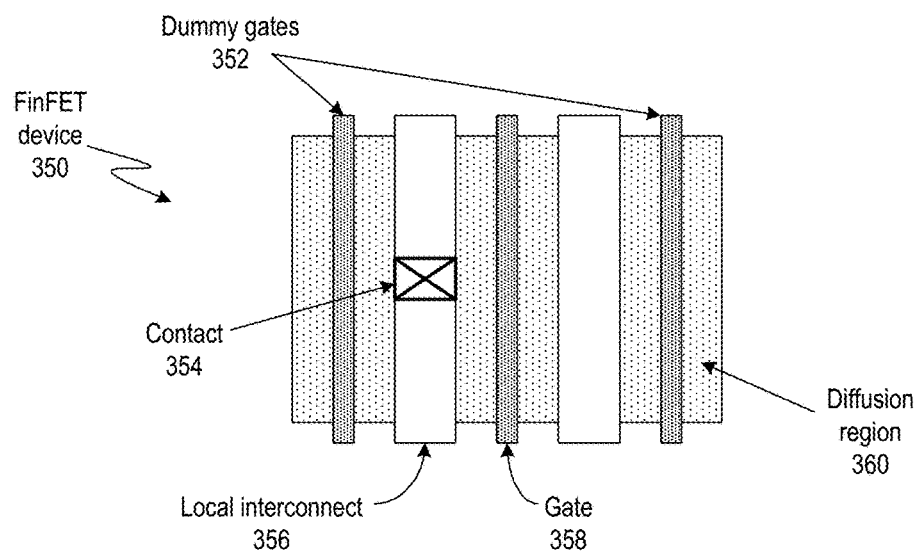
Figure 3C:
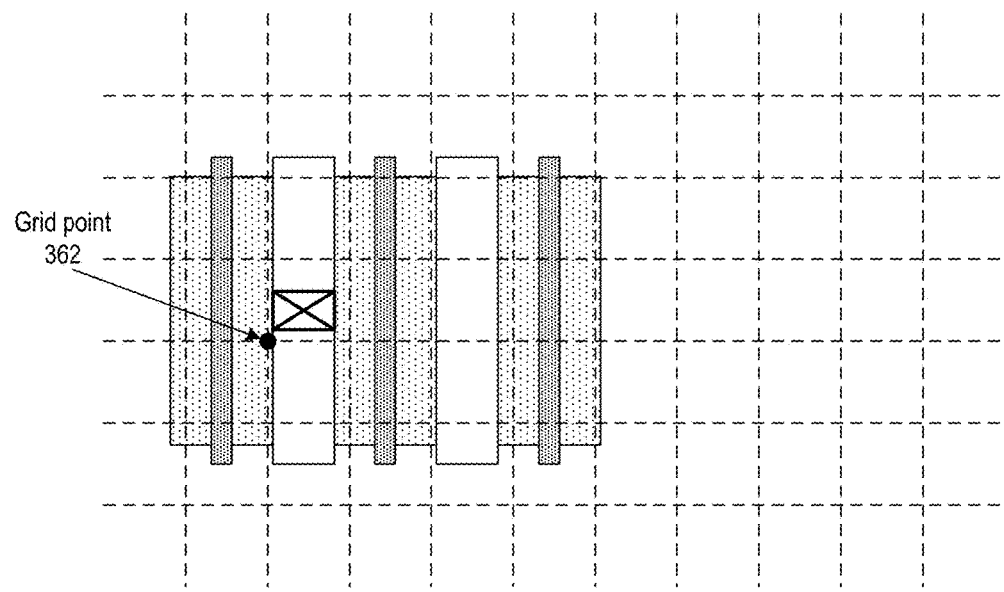
Figure 3D:
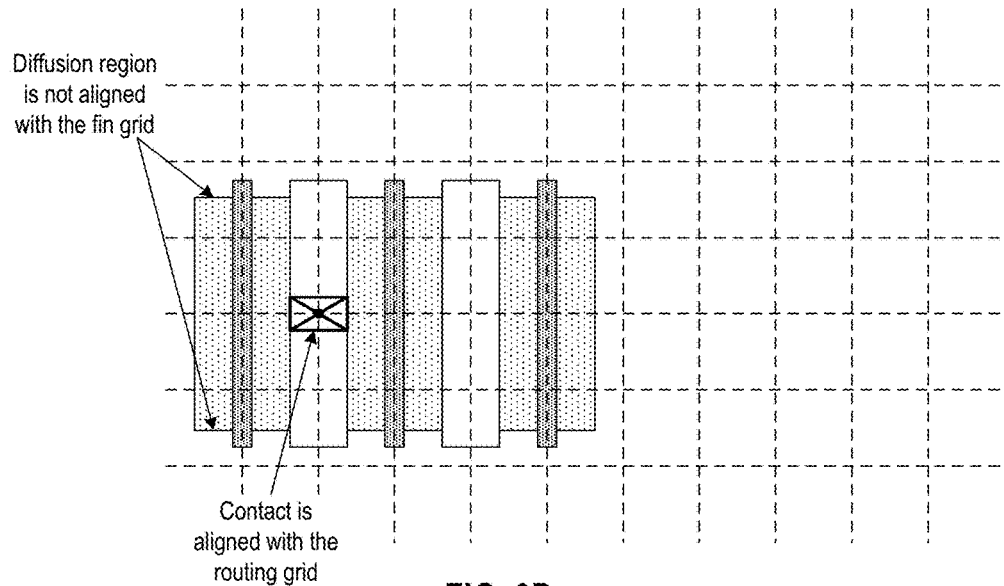
Figure 3E:
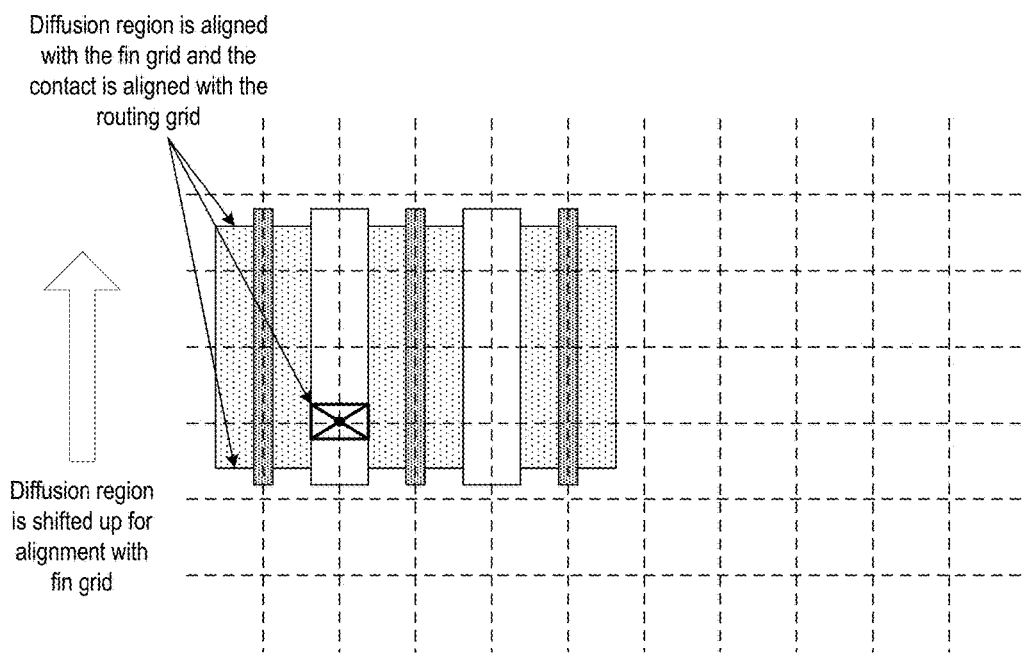

In FIG. 3B, FinFET device 350 can include dummy gates 352, contact 354, local interconnect 356, gate 358, and diffusion region 360. FIG. 3C illustrates a GUI view that shows a routing grid (illustrated using dashed lines) and an instance of FinFET device 350 that can be moved in the IC design layout (e.g., using a mouse). Once the layout engineer has selected a desired location, the layout engineer can instruct the IC design layout tool to place the FinFET device. Upon receiving the instruction, the IC design layout tool can move the FinFET device so that the contact is aligned with grid point 362, which is the closest grid point to the contact. FIG. 3D illustrates the view after grid point 362 is aligned with the contact. However, as shown in FIG. 3D, the diffusion region may not be aligned with the fin grid (not shown in FIG. 3D for the sake of clarity). Some embodiments described herein can then snap the diffusion region to the fin grid, i.e., move the diffusion region so that the diffusion region is aligned with the closest fin tracks in the fin grid. FIG. 3E illustrates the view after the diffusion region has been snapped to the fin grid. Note that the location of the contact in relation to the diffusion region has changed in FIG. 3E because when the diffusion region is snapped to the fin grid, the contact is not moved.

In this manner, some embodiments described herein can enable layout engineers to quickly and easily place FinFET devices in an IC design layout so that the contacts of the FinFET device are aligned with the routing grid and the diffusion region of the FinFET device is aligned with the fin grid.

Connection Matrix for Custom Layout of Multigate Devices

Once the multigate devices (e.g., FinFET devices) have been placed, the layout engineer can then electrically connect the devices. FIGS. 4A-4G illustrate a GUI that can be used to easily and quickly connect multigate devices in accordance with some embodiments described herein. Specifically, FIGS. 4A-4G illustrate how FinFETs for a 2-input multiplexer can be easily and quickly connected. FIGS. 4A-4G are for illustration purposes only and are not intended to limit the embodiments described herein to the forms disclosed.

Figure 4A:
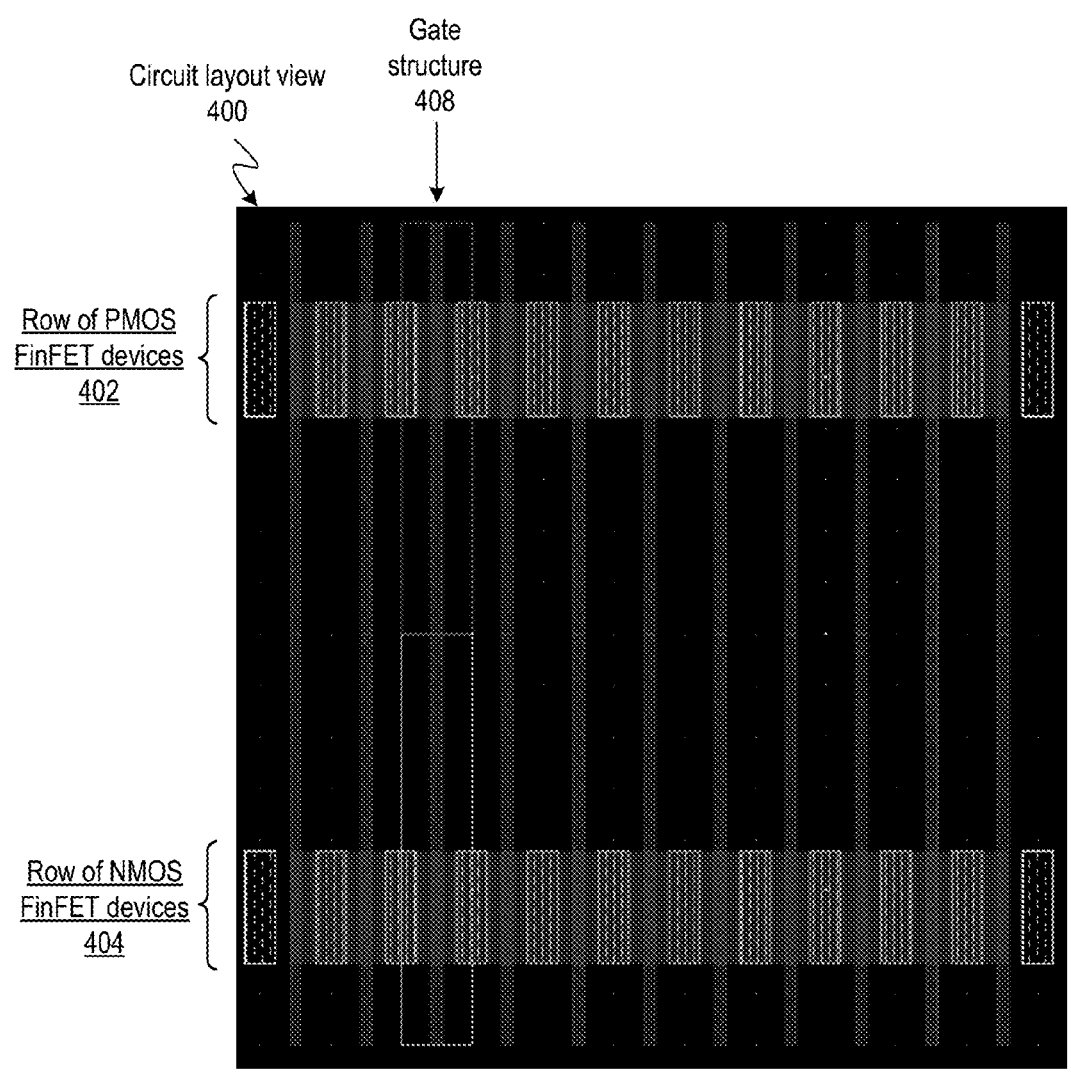
FIGS. 4A-4G illustrate a GUI that can be used to easily and quickly connect multigate devices in accordance with some embodiments described herein.

In FIG. 4A, circuit layout view 400 includes a row of PMOS FinFET devices 402 and a row of NMOS FinFET devices 404. The gates are represented using vertical rectangles. Note that a single gate structure exists for a PMOS FinFET device and a corresponding NMOS FinFET device. For example, gate structure 408 creates a single electrically connected gate for a PMOS FinFET device at the top and a corresponding NMOS FinFET device at the bottom. The green rectangles represent local interconnects that are used for connecting the sources and drains of the FinFET devices.

Figure 4B:
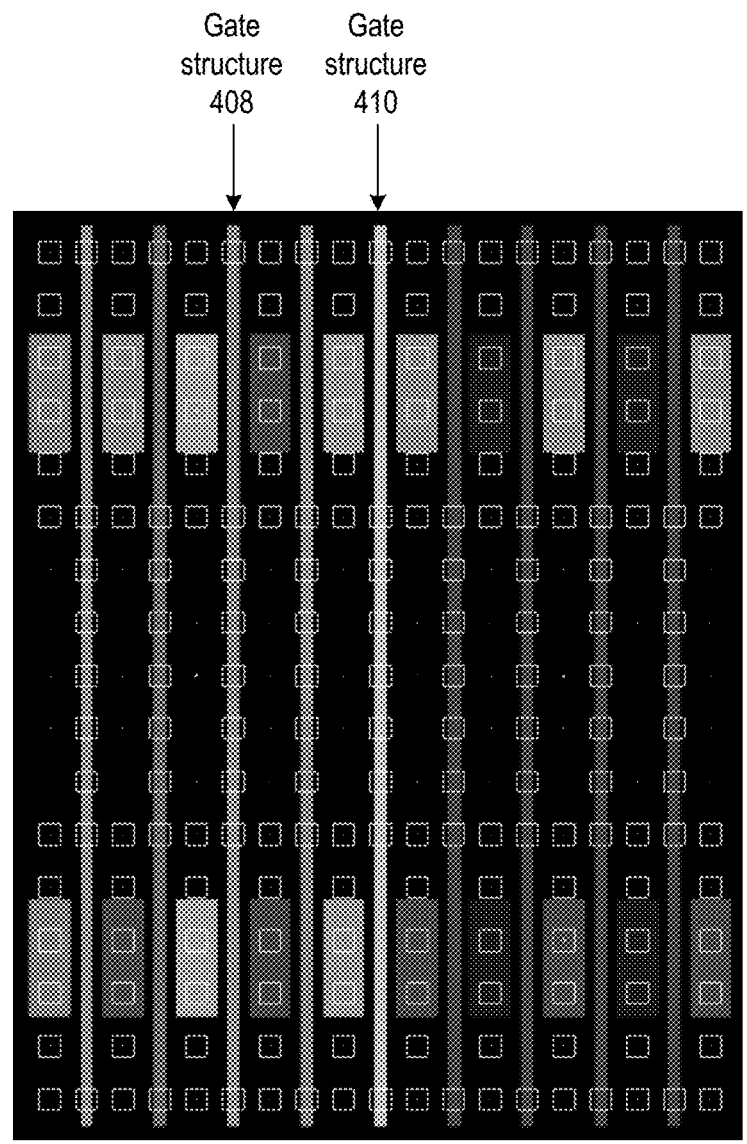
Figure 4C:
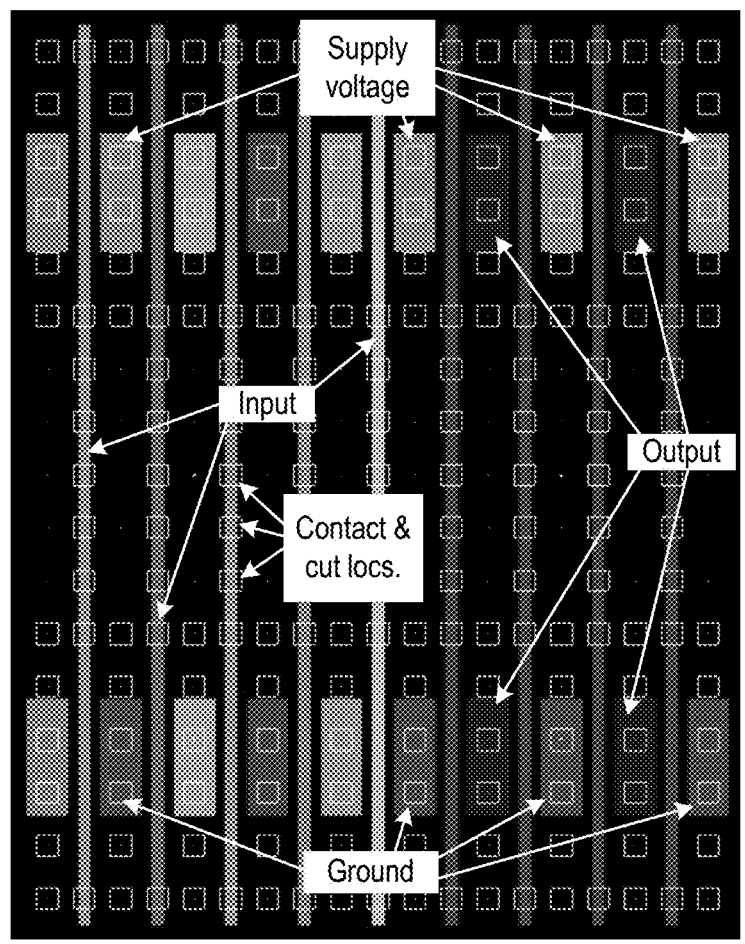

FIG. 4B illustrates how a connection matrix can be used to color the structures of the FinFET devices that are to be electrically connected with each other. For example, all structures that are green need to be electrically connected with each other. The white squares in FIG. 4B are locations where a contact can be created or where polysilicon can be cut. FIG. 4C annotates FIG. 4B to illustrate these aspects of the connection matrix. As shown in FIG. 4C, the tan areas correspond to the supply voltage connections; the grey, magenta, and yellow areas correspond to the three inputs of the 2-input MUX (two MUX inputs and a select input); the red areas correspond to the ground connections; and the blue areas correspond to the output of the 2-input MUX. The white squares correspond to contact and cut locations.

Note that the top and bottom halves of gate structure 408 have different colors, which means they should not be electrically connected to each other. Therefore, gate structure 408 will need to be cut so that the gates of the top PMOS FinFET device and the bottom NMOS FinFET device are not electrically connected to each other (this is described and shown in a subsequent figure). On the other hand, gate structure 410 has only one color. Therefore, there is no need to cut gate structure 410, because the gates of the top PMOS FinFET device and the bottom NMOS FinFET device are supposed to be electrically connected to each other. Specifically, in some embodiments, a layout engineer can create a contact or cut the polysilicon (e.g., gate structure 408) by clicking on a white square.

Figure 4D:
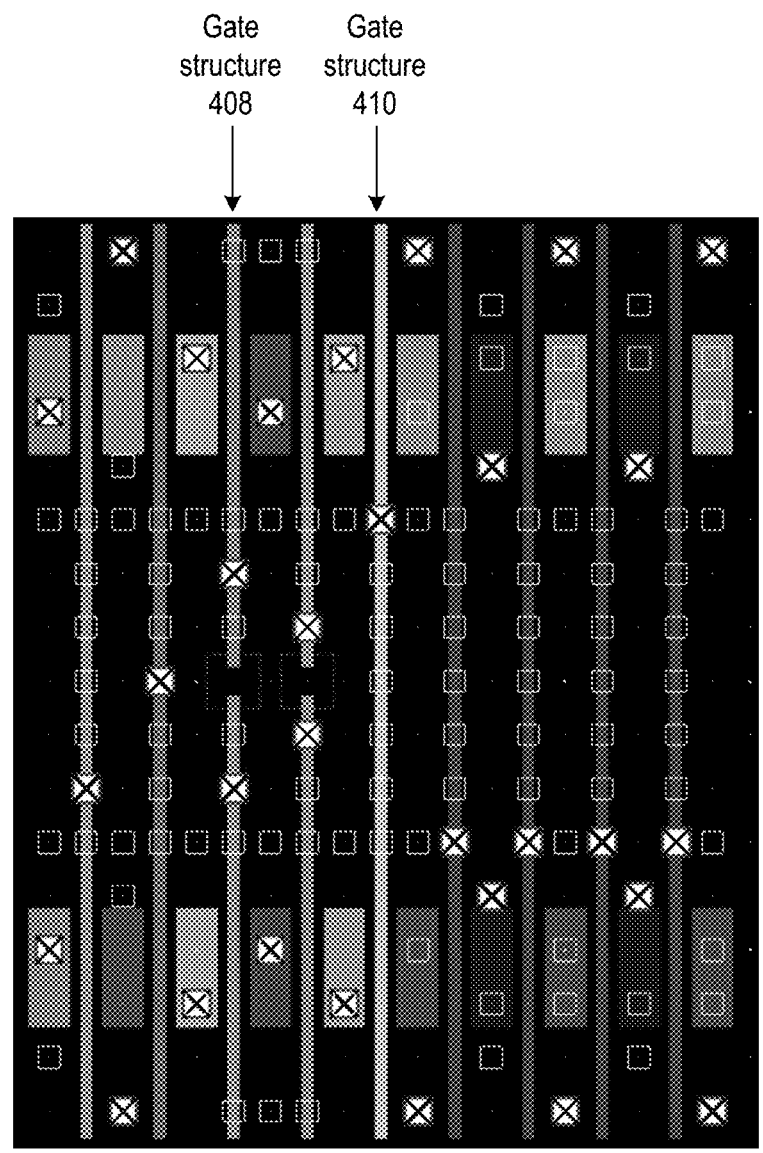
Figure 4E:
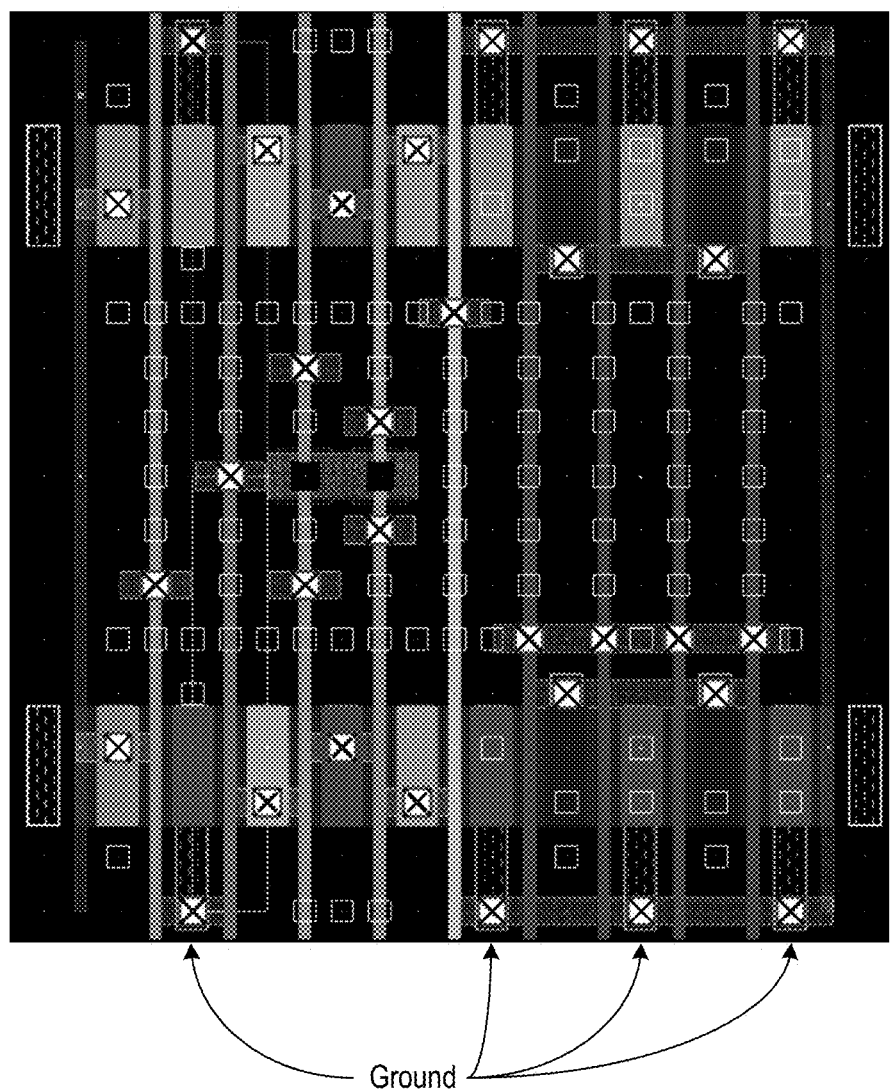

FIG. 4D illustrates the GUI view after a layout engineer has created contacts and cut polysilicon using the connection matrix. Note that gate structure 408 was cut in the middle, but gate structure 410 was not cut. Additionally, note that a contact (including a via structure) has been created for each structure that needs to be electrically connected to other structures. Other layers in the IC design layout are not shown in FIG. 4D for the sake of clarity. These layers are shown in FIG. 4E. Recall that there were four red areas that corresponded to the ground voltage connection. In FIG. 4E, the three red areas on the right have been electrically connected to each other via local interconnects. The remaining red area on the left can be be electrically connected with the other red areas by routing a wire in the metal layer.

Figure 4F:
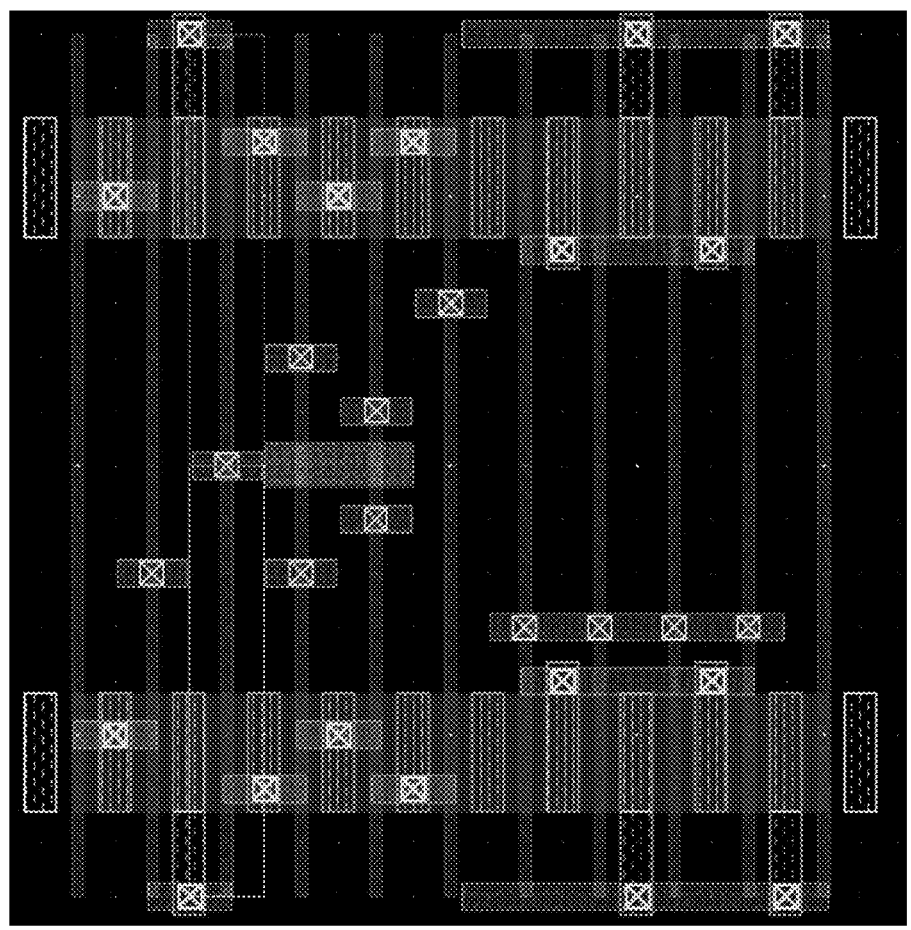
Figure 4G:
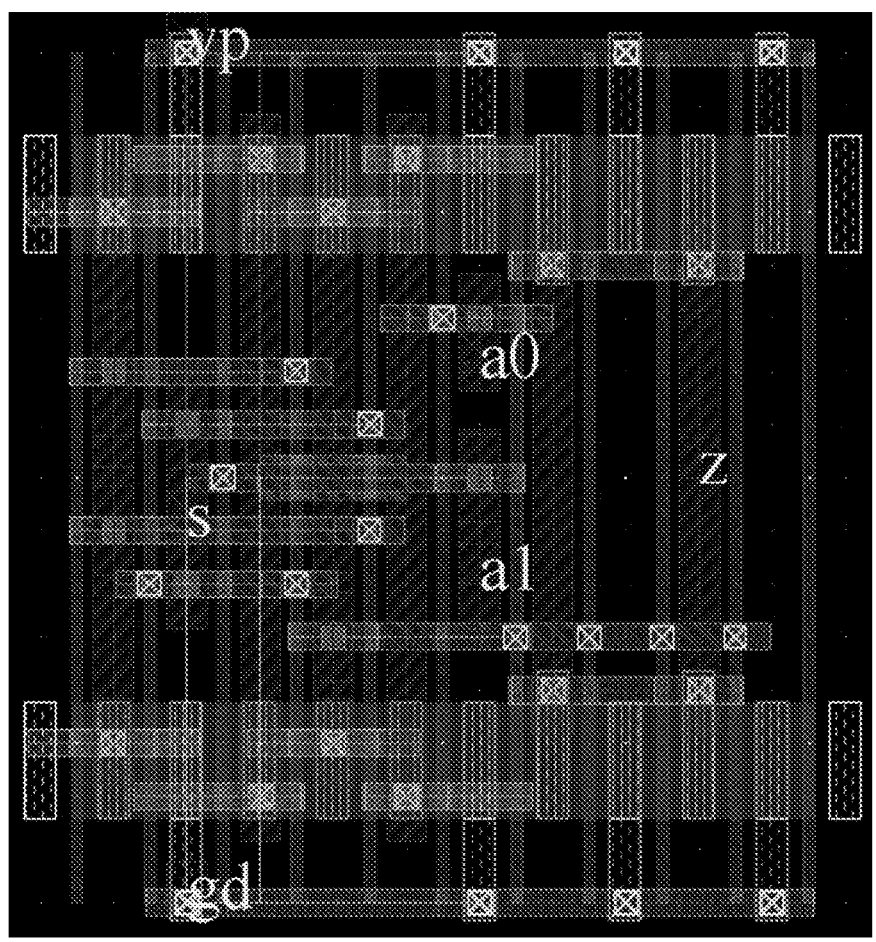

Once the layout engineer has used the connection matrix to create contacts and cut polysilicon at the appropriate locations in the IC design layout, the layout engineer can "turn off" the connection matrix to see the original layout as shown in FIG. 4F. Next, the layout engineer can use a router to route metal connections to complete the IC design layout. The final result is shown in FIG. 4G. FIG. 4G also contains annotations (yellow letters) to highlight the different parts of the 2-input MUX. Specifically, the power supply connection has been annotated as "vp," the ground connection has been annotated as "gd," the two inputs have been annotated as "a0" and "a1," the output has been annotated as "z," and the select input has been annotated as "s."

Processes for Facilitating Custom Layout of Multigate Devices

Figure 5A:
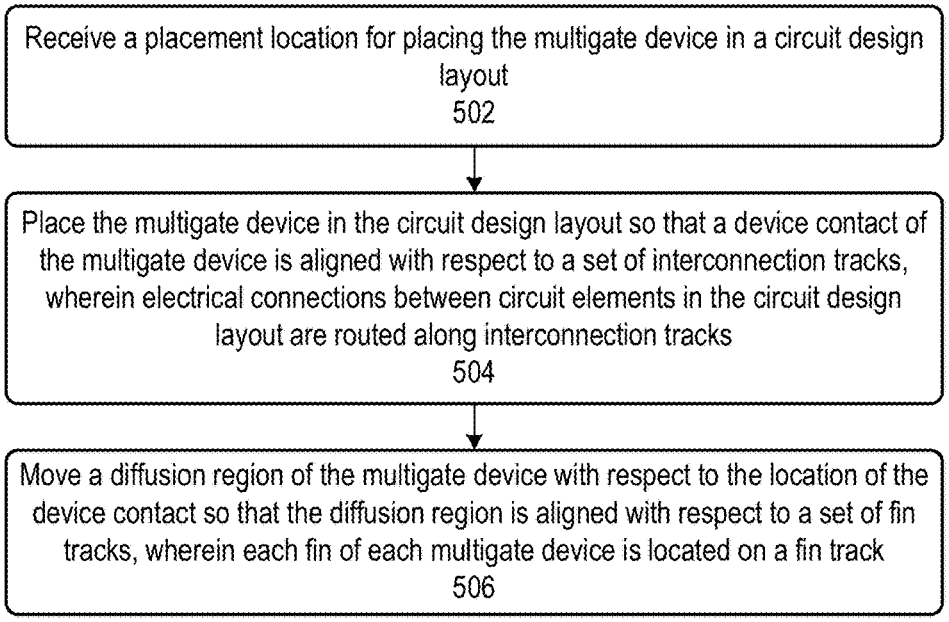
FIG. 5A illustrates a process for placing multigate devices in accordance with some embodiments described herein.

FIG. 5A illustrates a process for placing multigate devices in accordance with some embodiments described herein. The process can begin by receiving a placement location for placing the multigate device in an IC design layout (operation 502). Next, the process can place the multigate device in the IC design layout so that a device contact (e.g., gate, source, or drain contact) of the multigate device is aligned with respect to a set of interconnection tracks, wherein electrical connections between circuit elements in the IC design layout are routed along interconnection tracks (operation 504). The process can then move a diffusion region of the multigate device with respect to the location of the device contact so that the diffusion region is aligned with respect to a set of fin tracks, wherein each fin of each multigate device is located on a fin track (operation 506).

Figure 5B:
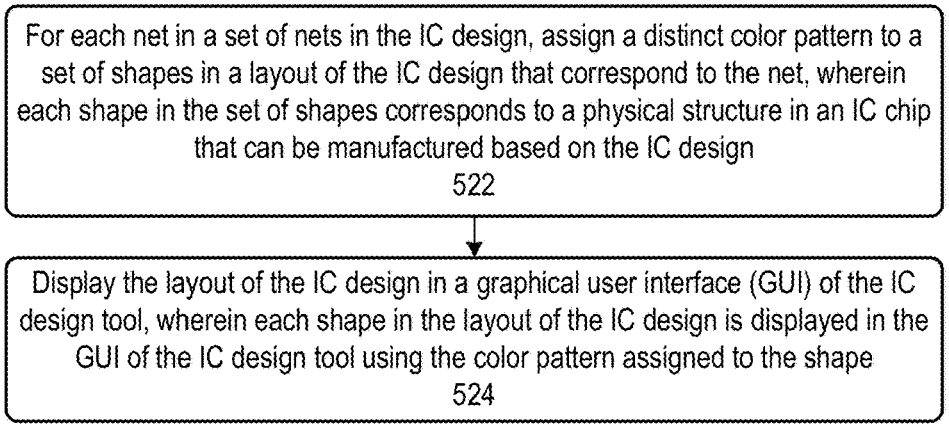
FIG. 5B illustrates a process for facilitating custom layout of an IC design in accordance with some embodiments described herein.

FIG. 5B illustrates a process for facilitating custom layout of an IC design in accordance with some embodiments described herein. The process can begin by, for each net in a set of nets in the IC design, assigning a distinct color pattern to a set of shapes in a layout of the IC design that correspond to the net, wherein each shape in the set of shapes corresponds to a physical structure in an IC chip that can be manufactured based on the IC design (operation 522). A color pattern can be a combination of a color and a pattern. In FIG. 4B, for example, the shapes that correspond to the "Ground" net are assigned the "solid red" color pattern, whereas the shapes that correspond to the "Output" net are assigned the "solid blue" color pattern. Although, the "solid" pattern has been used in FIG. 4B, the GUI can generally use any pattern, e.g., the GUI can use different types of hatching patterns. If only one color is available for coloring shapes in the GUI, then the GUI can use distinct hatching patterns to identify shapes that belong to different nets. Next, the process can display the layout of the IC design in a GUI of the IC design tool, wherein each shape in the layout of the IC design is displayed in the GUI of the IC design tool using the color pattern assigned to the shape (operation 524). In some embodiments, the process can begin by receiving an IC design layout and connectivity information about shapes corresponding to multigate devices in the IC design layout. Next, the process can color shapes in the IC design layout with one or more color patterns, wherein shapes that are to be electrically connected with one another are colored using the same color pattern. The process can then display the IC design layout with the colored shapes to a user via a GUI, thereby facilitating the user to electrically connect the shapes in the IC design layout based on the color patterns.

Figure 5C:
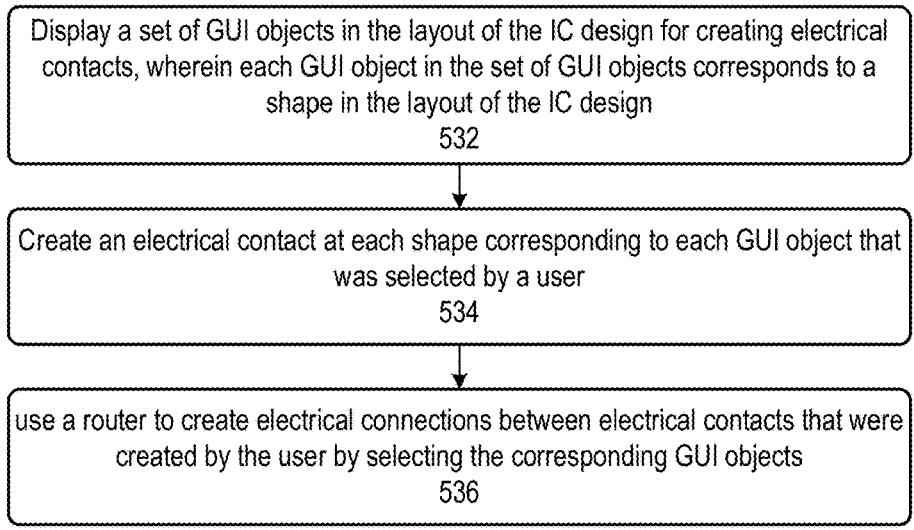
FIG. 5C illustrates a process for creating contacts in a layout of an IC design in accordance with some embodiments described herein.

FIG. 5C illustrates a process for creating contacts in a layout of an IC design in accordance with some embodiments described herein. The process can begin by displaying a set of GUI objects in the layout of the IC design for creating electrical contacts, wherein each GUI object in the set of GUI objects corresponds to a shape in the layout of the IC design (operation 532). Next, the process can create an electrical contact at each shape corresponding to each GUI object that was selected by a user (operation 534). The process can then use a router to create electrical connections between electrical contacts that were created by the user by selecting the corresponding GUI objects (operation 536). In some embodiments, the process can begin by displaying GUI objects in an IC design layout for creating electrical contacts with one or more shapes in one or more multigate devices. Next, the process can receive selections of one or more GUI objects from the user. The process can then create an electrical contact at each GUI object that was selected by the user. Next, the process can use a router to create electrical connections between the electrical contacts in the IC design layout that were created by selecting the GUI objects.

Figure 5D:
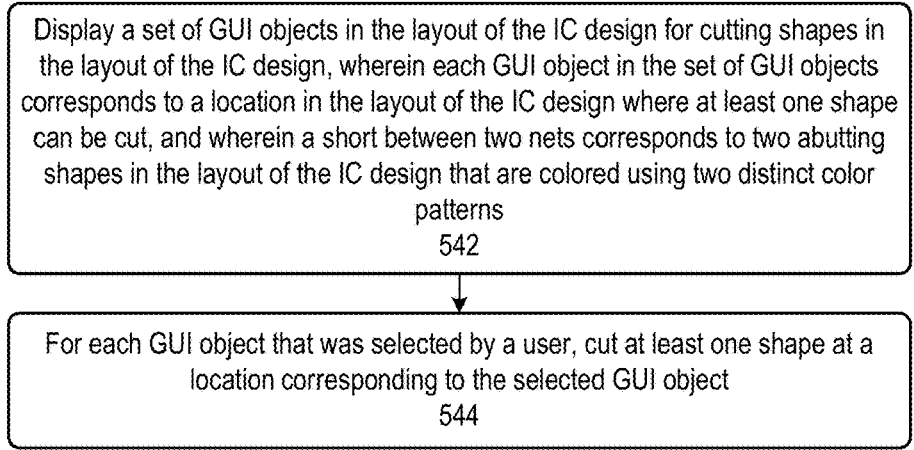
FIG. 5D illustrates a process for cutting one or more shapes in a layout of an IC design in accordance with some embodiments described herein.

FIG. 5D illustrates a process for cutting one or more shapes in a layout of an IC design in accordance with some embodiments described herein. The process can begin by displaying a set of GUI objects in the layout of the IC design for cutting shapes in the layout of the IC design, wherein each GUI object in the set of GUI objects corresponds to a location in the layout of the IC design where at least one shape can be cut, and wherein a short between two nets corresponds to two abutting shapes in the layout of the IC design that are colored using two distinct color patterns (operation 542). Next, the process can, for each GUI object that was selected by a user, cut at least one shape at a location corresponding to the selected GUI object (operation 544). In some embodiments, the process can begin by displaying GUI objects in the IC design layout for cutting a polysilicon shape in a multigate device. Next, the process can receive a selection of one or more GUI objects from a user. The process can then cut a polysilicon shape in the multigate device at each GUI object that was selected by the user.

Figure 6:
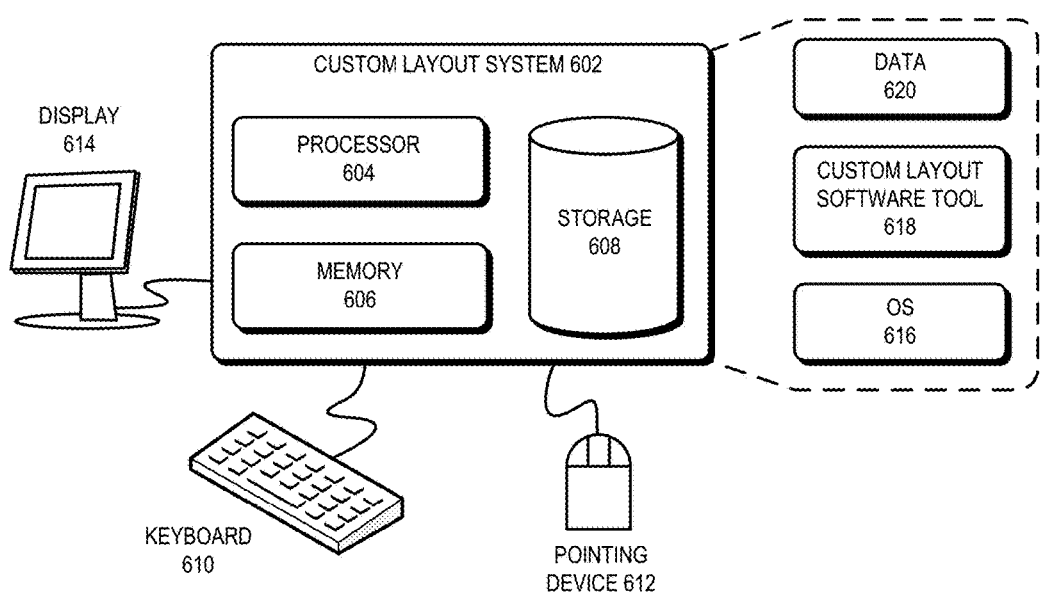
FIG. 6 illustrates a custom layout system in accordance with some embodiments described herein.

The term "custom layout system" generally refers to a hardware-based system that facilitates a custom layout for IC designs, especially those that include multigate devices. FIG. 6 illustrates a custom layout system in accordance with some embodiments described herein. Custom layout system 602 can include processor 604, memory 606, and storage device 608. Specifically, memory locations in memory 606 can be addressable by processor 604, thereby enabling processor 604 to access (e.g., via load/store instructions) and manipulate (e.g., via logical/floating point/arithmetic instructions) the data stored in memory 606. Custom layout system 602 can be coupled to display device 614, keyboard 610, and pointing device 612. Storage device 608 can store operating system 616, custom layout software tool 618, and data 620. Data 620 can include input required by custom layout software tool 618 and/or output generated by custom layout software tool 618.

Custom layout system 602 may automatically (or with user help) perform one or more operations that are implicitly or explicitly described in this disclosure. For example, custom layout system 602 can load custom layout software tool 618 into memory 606, and custom layout software tool 618 can then be used to create or edit a custom layout of an IC design.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data.

Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating custom layout of an integrated circuit (IC) design, the method comprising:
for each net in a set of nets in the IC design, assigning a distinct color pattern to a set of shapes in a layout of the IC design that correspond to the net, wherein each shape in the set of shapes represents a source, gate, or drain of a multigate device, and wherein each net in the set of nets specifies electrical connectivity between one or more multigate devices; and
displaying the layout of the IC design in a graphical user interface (GUI) of a computer, wherein each shape in the layout of the IC design is displayed in the GUI of the computer using the distinct color pattern assigned to the shape, thereby enabling a user to easily connect the one or more multigate devices.

2. The method of claim 1, further comprising:
displaying a set of GUI objects in the layout of the IC design for cutting shapes in the layout of the IC design, wherein each GUI object in the set of GUI objects corresponds to a location in the layout of the IC design where at least one shape can be cut, and wherein a short between two nets corresponds to two abutting shapes in the layout of the IC design that are colored using two distinct color patterns; and
for each GUI object that was selected by a user, cutting at least one shape at a location corresponding to the GUI object that was selected by the user.

3. The method of claim 1, further comprising:
displaying a set of GUI objects in the layout of the IC design for creating electrical contacts, wherein each GUI object in the set of GUI objects corresponds to a shape in the layout of the IC design; and
creating an electrical contact at each shape corresponding to each GUI object that was selected by a user.

4. The method of claim 3, further comprising:
using a router to create electrical connections between electrical contacts that were created by the user by selecting GUI objects.

5. The method of claim 1, wherein each color pattern is a combination of a color and a pattern.

6. A non-transitory computer-readable storage medium storing instructions that, when executed by a computer, cause the computer to perform a method for facilitating custom layout of an integrated circuit (IC) design, the method comprising:
for each net in a set of nets in the IC design, assigning a distinct color pattern to a set of shapes in a layout of the IC design that correspond to the net, wherein each shape in the set of shapes represents a source, gate, or drain of a multigate device, and wherein each net in the set of nets specifies electrical connectivity between one or more multigate devices; and
displaying the layout of the IC design in a graphical user interface (GUI) of the computer, wherein each shape in the layout of the IC design is displayed in the GUI of the computer using the distinct color pattern assigned to the shape, thereby enabling a user to easily connect the one or more multigate devices.

7. The non-transitory computer-readable storage medium of claim 6, wherein the instructions, when executed by the computer, cause the computer to:
display a set of GUI objects in the layout of the IC design for cutting shapes in the layout of the IC design, wherein each GUI object in the set of GUI objects corresponds to a location in the layout of the IC design where at least one shape can be cut, and wherein a short between two nets corresponds to two abutting shapes in the layout of the IC design that are colored using two distinct color patterns; and
for each GUI object that was selected by a user, cut at least one shape at a location corresponding to the GUI object that was selected by the user.

8. The non-transitory computer-readable storage medium of claim 6, wherein the instructions, when executed by the computer, cause the computer to:
display a set of GUI objects in the layout of the IC design for creating electrical contacts, wherein each GUI object in the set of GUI objects corresponds to a shape in the layout of the IC design; and
create an electrical contact at each shape corresponding to each GUI object that was selected by a user.

9. The non-transitory computer-readable storage medium of claim 8, wherein the instructions, when executed by the computer, cause the computer to:
use a router to create electrical connections between electrical contacts that were created by the user by selecting the GUI objects.

10. The non-transitory computer-readable storage medium of claim 6, wherein each color pattern is a combination of a color and a pattern.

11. An apparatus, comprising:
a processor;
a graphical user interface (GUI); and
a non-transitory computer-readable storage medium storing instructions that, when executed by the processor, cause the processor to perform a method for facilitating custom layout of an integrated circuit (IC) design, the method comprising:
for each net in a set of nets in the IC design, assigning a distinct color pattern to a set of shapes in a layout of the IC design that correspond to the net, wherein each shape in the set of shapes represents a source, gate, or drain of a multigate device, and wherein each net in the set of nets specifies electrical connectivity between one or more multigate devices; and displaying the layout of the IC design in the GUI, wherein each shape in the layout of the IC design is displayed in the GUI using the distinct color pattern assigned to the shape, thereby enabling a user to easily connect the one or more multigate devices.

12. The apparatus of claim 11, wherein the instructions, when executed by the processor, cause the processor to:
   display a set of GUI objects in the layout of the IC design for cutting shapes in the layout of the IC design, wherein each GUI object in the set of GUI objects corresponds to a location in the layout of the IC design where at least one shape can be cut, and wherein a short between two nets corresponds to two abutting shapes in the layout of the IC design that are colored using two distinct color patterns; and
   for each GUI object that was selected by a user, cut at least one shape at a location corresponding to the GUI object that was selected by the user.

13. The apparatus of claim 11, wherein the instructions, when executed by the processor, cause the processor to:
   display a set of GUI objects in the layout of the IC design for creating electrical contacts, wherein each GUI object in the set of GUI objects corresponds to a shape in the layout of the IC design; and
   create an electrical contact at each shape corresponding to each GUI object that was selected by a user.

14. The apparatus of claim 13, wherein the instructions, when executed by the processor, cause the processor to:
   use a router to create electrical connections between electrical contacts that were created by the user by selecting GUI objects.

15. The apparatus of claim 11, wherein each color pattern is a combination of a color and a pattern.

* * * * *